United States Patent
Tanaka et al.

[11] Patent Number: 5,873,956
[45] Date of Patent: Feb. 23, 1999

[54] ROLLING BEARING

[75] Inventors: Susumu Tanaka; Kenji Yamamura; Manabu Ohori, all of Kanagawa, Japan

[73] Assignee: NSK Ltd., Tokyo, Japan

[21] Appl. No.: 803,882

[22] Filed: Feb. 21, 1997

[30] Foreign Application Priority Data

Feb. 21, 1996 [JP] Japan .................................. 8-034066
Jul. 11, 1996 [JP] Japan .................................. 8-182174

[51] Int. Cl.$^6$ ............................. C22C 38/18; C23C 8/32
[52] U.S. Cl. ...................... 148/318; 148/319; 148/906; 384/492
[58] Field of Search .................. 148/318, 319, 148/906; 384/492

[56] References Cited

U.S. PATENT DOCUMENTS 5,292,200 3/1994 Matsumoto et al. ............... 384/492
5,424,028 6/1995 Maloney et al. ................... 420/38

FOREIGN PATENT DOCUMENTS 0 411 931 2/1991 European Pat. Off. ......... C22C 38/30
40425572 9/1992 Japan .................................. 148/906
2234523 2/1991 United Kingdom .

OTHER PUBLICATIONS

Eckstein, Hans–Joachim: Technologie der Warmebehandlung von Stahl, 2., stark uberarb. Aufl. Leipzig: VEB Deutscher Verlag fur Grundstoffindustrie, 1987, pp. 174–176 and 236–241.

*Primary Examiner*—Deborah Yee
*Attorney, Agent, or Firm*—Sughrue, Mion, Zinn, Macpeak & Seas, PLLC

[57] ABSTRACT

In order to provide rolling bearings of high performance using case hardened stainless steels that are superior to the conventional martensite base stainless steels in terms of corrosion resistance, rolling fatigue strength and wear resistance and which also have high core toughness, at least one member of the rolling bearing selected from among the inner race, the outer race and the rolling elements is made of an alloy steel consisting essentially of less than 0.5 wt % C, 8.0 to 20.0 wt % Cr, 0.1 to 1.5 wt % Mn, 0.1 to 2.0 wt % Si and the balance of Fe and incidental impurity elements; the relationship between the C and Cr contents satisfies 0.04 Cr (wt %)−0.39≦C (wt %)≦−0.05 Cr (wt %)+1.41; the bearing also has a surface layer that is formed by nitriding or carbonitriding at a temperature below $Ac_1$, subsequent heating at a temperature of 900° to 1,200° C., hardening, a subzero treatment and tempering.

6 Claims, 5 Drawing Sheets

ROLLING BEARING

BACKGROUND OF THE INVENTION

The present invention relates to rolling bearings for use in aircraft, food processing machines and other applications where high corrosion resistance is required. The invention particularly concerns efforts to upgrade the performance of such rolling bearings.

Rolling bearings are usually made of steel materials equivalent to SUJ2 (bearing steel) or SCR420 (case hardening steel) but if they are used in the presence of water or under humid conditions or in other corrosive environments, they will experience premature rust formation and become no longer suitable for subsequent use.

Under the circumstances, SUS440C and other martensite-base steels have been substituted as high chromium bearing stainless steels that have not only high corrosion resistance but also the hardness of HRC 58 and above which is required for bearings.

Rolling bearings made of stainless steels are in most cases used in severer conditions than those experienced by rolling bearings made of plain steels and particularly in the presence of water or under moist conditions or in other corrosive environments, wear resistance with the potential for poor lubrication being also taken into account is an extremely important factor, to say nothing of corrosion resistance. The carbon in steels is an indispensable element for providing increased hardness by the strengthening of martensite and the formation of carbides contributes to a further improvement in wear resistance.

With aircraft bearings which are to be used at high temperatures and speeds, high core strength under hoop stress is required in addition to high corrosion resistance and fatigue strength.

The martensite-base high chromium stainless steels typified by SUS440C have a problem in that if the carbon level increases, the high C and Cr content of the steel causes many coarse (>10 μm) eutectic carbides to form, thereby deteriorating not only the steel's corrosion resistance, rolling life and toughness but also its forgeability and machinability.

If simply hardened, the conventional martensite-base stainless steels have large amounts of retained austenite, so they are usually subjected to a subzero treatment after the hardening operation. In the case of aircraft bearings which are to be used in comparatively high temperatures or with which dimensional stability is particularly important, the subzero treatment is occasionally followed by tempering at elevated temperatures of 400° to 600° C. However, if the conventional martensite-base stainless steels are tempered at 400° to 600° C., their hardness will drop to HRC 55 to 57 or even below, thereby causing deterioration in fatigue strength and wear resistance.

Another problem with the conventional high carbon martensite-base stainless steels is that the secondary precipitation of Cr carbides occurs during tempering and that if tempering is done at high temperatures, the corrosion resistance of the steels will drop markedly.

With a view to solving the aforementioned problems, Unexamined Published Japanese Patent Application Sho 61-163244 proposed that the C and Cr content be reduced to retard the formation of eutectic carbides, thereby providing improved fatigue strength and toughness without sacrificing the wear resistance. However, the proposed attempt is unsatisfactory in the improvements of resistance and to wear corrosion and, what is more, no consideration is given to the dimensional stability problem resulting from the retained austenite and the effects on fatigue strength, corrosion resistance and wear resistance that may be imposed by the high-temperature tempering which is performed in order to decompose the retained austenite.

According to Unexamined Published Japanese Patent Application Hei 1-205063, there is provided a wear-resistant stainless steel part that is improved in core toughness by limiting the carbon level to 0.6 wt % and below and which has been carburized to impart high surface hardness. The part, however, is not satisfactorily improved in corrosion resistance.

Speaking of bearings that are specifically intended for use in aircraft jet engines and gas turbines, they are subjected to high temperatures and speeds during service as already mentioned and, hence, require not only high core strength under hoop stress but also sufficient hardness at elevated temperatures. Conventionally, these bearings are made of semi-high-speed materials such as AISIM50 and M5ONiL; however, these materials are so low in corrosion resistance that they tend to experience premature rust formation due to salt damage in unfavorable locations such as airports adjoining the sea. Since safety is of utmost importance to aircraft bearings, their life may be recognized to have ended no matter how limited the rust formation is. Therefore, from a corrosion resistance viewpoint, aircraft bearings are preferably made of stainless steels materials.

However, the conventional stainless steel materials such as SUS440C do not have satisfactory hardness under elevated temperatures and hence are not suitable for use as bearing materials in aircraft engines. A further problem with the stated type of high-carbon martensite-base stainless steels is that if they are tempered at high temperature, the chromium in the matrix will precipitate as carbides, thereby damaging its corrosion resistance considerably.

SUMMARY OF THE INVENTION

It is a first object of the present invention is to provide rolling bearings of upgraded performance that are made from case-hardened stainless steels that are improved in corrosion resistance, rolling fatigue strength and wear resistance over the conventional martensite-base stainless steels and which also have high core toughness.

In addition, it is a second object of the present invention to provide rolling bearings that not only have satisfactory corrosion resistance but which also exhibit better performance in other aspects, such as rolling fatigue strength at high temperature and core strength (toughness) under hoop stress, thereby assuring excellent performance in the aircraft applications.

The first object of the invention can be attained by a rolling bearing comprising an inner race, an outer race and rolling elements, in which at least one member selected from among said inner race, said outer race and said rolling elements is made of an alloy steel consisting essentially of less than 0.5 wt % C, 8.0 to 20.0 wt % Cr, 0.1 to 1.5 wt % Mn, 0.1 to 2.0 wt % Si and the balance of Fe and incidental impurity elements, with the relationship between the C and Cr contents satisfying:

0.04 Cr (wt %)−0.39≦C (wt %)≦−0.05 Cr (wt %)+1.41, wherein said at least one member comprises a surface layer that is formed by nitriding or carbonitriding at a temperature below $Ac_1$, subsequent heating at a temperature of 900° to 1,200° C., hardening, a subzero treatment and tempering.

The first object of the invention can be also attained by a rolling bearing comprising an inner race, an outer race and rolling elements, in which at least one member selected from among said inner race, said outer race and said rolling elements is made of an alloy steel consisting essentially of less than 0.5 wt % C, 8.0 to 20.0 wt % Cr, 0.1 to 1.5 wt % Mn, 0.1 to 2.0 wt % Si, 0.05 to less than 0.2 wt % of N, and the balance of Fe and incidental impurity elements, with the relationship among the C, Cr and N contents satisfying:

0.04 Cr %−0.83 N %−0.39≦C %≦−0.05 Cr %+1.41 and wherein said at least one element comprises a surface layer that is formed by nitriding or carbonitriding at a temperature below $Ac_1$, subsequent heating at a temperature of 900° to 1,200° C., hardening, a subzero treatment and tempering, said surface layer containing 0.05 to 1.2 wt % N and 0.45 to 1.5 wt % of C+N.

Further, the second object of the invention can be attained by a rolling bearing with upgraded performance that is suitable for use under high-temperature and high-speed conditions as are encountered during service on aircraft jet engines or gas turbines and which comprises an inner race, an outer race and rolling elements, characterized in that at least one member selected from among said inner race, said outer race and said rolling elements is made of an alloy steel consisting essentially of less than 0.3 wt % C, 8.0 to 20.0 wt % Cr, 0.1 to 1.5 wt % Mn, 0.1 to 2.0 wt % Si, 0.4 to 3.0 wt % Mo, 0.4 to 2.0 wt % V, 1.0 to 3.5 wt % Ni, 1.0 to 10.0 wt % Co, less than 0.2 wt % N and the balance of Fe and incidental impurity elements, also characterized in that [eq1] or an equation that represents the content (wt %) of at lest one element for accelerating the formation of ferrite in the base material and [eq2] or an equation that represents the content (wt %) of at least one element for accelerating the formation of austenite in the base material satisfy the following interrelationship:

$$[eq2]>0.04\times[eq1]-0.39 \quad (1)$$

where [eq1]=Cr %+Si %+1.5 Mo %+3.5 V %; [eq2]=C %+0.83 N %+0.05 (Co+Ni) %+0.12 Mn %
and further characterized by having a surface layer that is formed by nitriding or carbonitriding at a temperature below $Ac_1$, subsequent heating at 900° to 1,200° C., a subzero treatment and tempering, said surface layer containing 0.15 to 1.2 wt % N and 0.45 to 1.5 wt % of C+N.

DETAILED DESCRIPTION OF THE PREFERRED EMBODIMENTS

The present inventors conducted experiments in which the level of carbon which, when contained in an increased amount, would form coarse eutectic carbides to impair the various capabilities of steels was reduced and to compensate for this, nitrogen also having a solid solution strengthening action was added; the inventors studied the potential effects of the levels of nitrogen, carbon and other alloying components on the resistance to corrosion and wear. As a result, it was found that when nitrogen was added to compensate for the reduced carbon level, the formation of coarse eutectic carbides could be retarded and, hence, the corrosion resistance was significantly improved over the conventional stainless steels and could be maintained even after tempering at high temperatures above 400° C. and that the formation of fine-grained nitrides contributed to provide increased wear resistance. In addition, the reduced carbon level could also retard the generation of eutectic carbides to offer the added advantage of improving the toughness and fatigue strength.

On the other hand, it was found that due to the very small solubility of nitrogen in molten steel, adding more than 0.2 wt % of nitrogen was difficult to accomplish by the conventional atmospheric steelmaking process. In order to produce steels containing more than 0.2 wt % of nitrogen, a facility that enables steelmaking operations to be performed in a high-pressure nitrogen atmosphere is necessary and this leads to a substantial increase in the production cost. In addition, if a large amount of nitrogen is forced into the molten steel at atmospheric pressure, air bubbles will be generated in the solidifying melt and a number of voids may be incorporated in steel ingots. Therefore, in conventional refining processes, the addition of nitrogen is limited to less than 0.2 wt %.

Note that German Patent Publication DE4033706C2 teaches a method in which steels are nitrided in a nitrogenous atmosphere such as ammonia or nitrogen gas at temperatures above $Ac_1$ such that more than 0.42 wt % of nitrogen is incorporated in a surface layer. However, this patent gives no consideration whatsoever to the correlationship between the Cr level and each of the C and N levels which will affect the corrosion resistance, or to the effects those alloying elements will have on the fatigue strength and wear resistance.

On the other hand, the hardness of HRC 58 and above which is required for successful performance of bearings cannot be attained unless the total content of carbon and nitrogen is more than 0.45 wt %. Therefore, if the nitrogen level is less than the upper limit 0.2 wt %, it naturally follows that carbon should be contained in an amount greater than 0.25 wt %. A further increase in hardness can only be realized by incorporating more carbon to generate available carbide precipitates. However, if more than 0.5 wt % of carbon is contained, coarse eutectic carbides tend to form during solidification and adversely affect corrosion resistance and toughness. Therefore, in order to improve these properties, the level of carbon which is deleterious to corrosion resistance is preferably reduced to thereby retard the formation of eutectic carbides while adding nitrogen which is not only favorable to corrosion resistance but also characterized by being as effective as carbon in the solid solution hardening of martensite.

In the light of these facts, the present inventors made studies in order to develop an effective method of nitrogen addition and produced case-hardened stainless steels by nitriding or carbonitriding such that they would be upgraded to exhibit better performance.

Nitriding or carbonitriding practices in the state-of-the-art heat treatment technology include ion nitriding tuf ftriding, gas sof t nitriding and plasma carbonitriding. Upon usual treatments at temperatures below $Ac_1$, the nitrided surface layer is covered with hard (Hv>1,000) layers of compounds such as $Fe_4N$, $Fe_2N$, $Fe_3N$, CrN and $Cr_2N$, thus exhibiting high wear resistance.

However, the layers of these nitrogen compounds are no thicker than about 50 to 150 μm and with the grinding allowance of bearings being typically on the order of 100 to 150 μm, it is extremely difficult to ensure that the hard layers are retained in that area extending from the surface of a finished product to a depth of 0.022 Da (Da=diameter of each rolling element) which corresponds to the position of maximum shear stress. In addition, the layers of such nitrogen compounds are so extensively deprived of the Cr in the matrix that their corrosion resistance will deteriorate markedly.

It was further found that in order to perform nitriding in the austenite region (1,100° to 1,250° C.) using an ammonia or nitrogen gas atmosphere, nitrogen gas of an extremely high purity had to be used by this only lowered the production rate and, in addition, it was difficult to increase the nitrogen level due to the small nitrogen potential (nitrogen in solid solution at equilibrium) of the nitrogenous atmosphere. The nitrogen in solid solution at equilibrium is dependent on the nitrogen partial pressure and temperature or the contents of Cr and other alloying components of the steel and can be increased by HIP and other methods for increasing the nitrogen partial pressure; however, this is not preferred from a productivity view point. According to another finding, a prolonged nitriding in the austenite region (1,100° to 1,250° C.) caused the growth and coarsening of austenitic grains, thereby reducing the steel's strength.

Under the circumstances, the present inventors made experiments in which nitriding (or carbonitriding) was applied as in the conventional method at temperatures below $Ac_1$ and further nitrogen diffusion was subsequently attempted at temperatures above $Ac_1$. The inventors also studied the effects of the levels of nitrogen, carbon and other alloying components that would be caused on the resistance to corrosion and wear.

As a result, the following observations were obtained: when an ally steel having the stated composition was nitrided at temperatures below $Ac_1$ to increase the concentration of nitrogen in the surface layer (i.e., to form nitrogen compounds), followed by temperature holding at 900° to 1,200° C., nitrogen diffusion could be accomplished in a comparatively short time; in addition, the fine-grained nitrides formed during nitriding or nitrogen diffusion such as CrN, $Cr_2N$, VN and $Mo_2N$ contributed a "pinning" effect to retard the growth of austenitic grains and, as a result of subsequent hardening, fine nitride crystal grains were produced to improve the fatigue strength of the steel; what is more, satisfactory corrosion resistance could be attained by adjusting the nitrogen and carbon concentrations to appropriate levels.

As already mentioned, if the carbon content is reduced, the formation of eutectic carbides is retarded but, on the other hand, the chance of formation of delta (δ) ferrite which adversely affects the core toughness is increased. Noting that some elements would accelerate the formation of austenite (i.e., retard the formation of δ-ferrite) while others would accelerate the formation of δ-ferrite, the present inventors investigated how the formation of δ-ferrite was affected by the correlationship between the contents of various elements including carbon and chromium. As a result, it was found that the formation of δ-ferrite could be retarded by ensuring that the interrelationship between the contents of specified elements would satisfy a certain mathematical expression; the present invention has been accomplished on the basis of this finding.

Thus, the first object of the invention can be attained by a rolling bearing which comprises an inner race, an outer race and rolling elements, characterized in that at least one member selected from among said inner race, said outer race and said rolling elements is made of an alloy steel consisting essentially of less than 0.5 wt % C, 8.0 to 20.0 wt % Cr, 0.1 to 1.5 wt % Mn, 0.1 to 2.0 wt % Si and the balance of Fe and incidental impurity elements, also characterized in that [eq1] or an equation that represents the content (wt %) of at least one element for accelerating the formation of ferrite in the base material and [eq2] or an equation that represents the content (wt %) of at least one element for accelerating the formation of austenite in the base material satisfies the following interrelationship:

$$[eq2] \geq 0.04 \times [eq1] - 0.39 \quad (1)$$

and further characterized by having a surface layer that is formed by nitriding or carbonitriding at a temperature below $Ac_1$, subsequent heating at a temperature of 900° to 1,200° C., hardening, a subzero treatment and tempering.

In one embodiment of the invention, [eq1] and [eq2] represent the contents (wt %) of Cr and C, respectively, and satisfy the correlationship expressed by formula (1). This is effective in retarding the formation of δ-ferrite.

In another embodiment, [eq1] and [eq2] represent the percent contents of Cr and C, respectively, and satisfy not only the correlationship expressed by formula (1) but also the following correlationship:

$$[eq2] \leq -0.05 \times [eq1] + 1.41 \quad (2)$$

This is effective in retarding not only the formation of δ-ferrite but also the formation of eutectic carbides.

In yet another embodiment, the base material contains from 0.05 to less than 0.2 wt % of N, [eq1] represents the content (wt %) of Cr, [eq2] represents C (wt %)+0.83 N (wt %), the two equations satisfy not only the correlationship expressed by formula (1) but also the following correlationship:

$$C \% \leq -0.05 \; Cr \% + 1.41 \quad (2)$$

and the surface layer contains 0.05 to 1.2 wt % N and 0.45 to 1.5 wt % of C+N. Thus, in the alloy steel of which the rolling bearing of the present invention is made, part of C which is deleterious from the viewpoint of corrosion resistance is replaced by N which has a comparable solid solution strengthening action and, as a result, the corrosion resistance of the rolling bearing is markedly improved such that it is upgraded to exhibit even better performance.

The present inventors continued their studies in order to further upgrade the performance of rolling bearings of a type that was to be used under hostile (high-temperature and high-speed) conditions as are encountered during the service on aircraft jet engines and gas turbines. As a result, they found that by adding suitable amounts of Ni and Co to the base material of the bearing, the formation of δ-ferrite was retarded and, hence, the content of carbon which was deleterious to corrosion resistance could be sufficiently reduced to realize better corrosion resistance. The inventors also found the importance of the total content of Ni and Co which were elements capable of the solid solution strengthening of the matrix, as well as the total content of Mo and V which would not only penetrate directly into the matrix to effect its solid solution strengthening but also form carbides or nitrides contributing to the precipitation strengthening of the microstructure; when these two kinds of total content were adjusted to appropriate levels, the bearing had satisfactory life characteristics at elevated temperatures; the second aspect of the present invention has been accomplished on the basis of this finding.

Thus, the second object of the invention can be attained by a rolling bearing with upgraded performance that is suitable for use under high-temperature and high-speed conditions as are encountered during service on aircraft jet engines or gas turbines and which comprises an inner race, an outer race and rolling elements, characterized in that at least one member selected from among said inner race, said outer race and said rolling elements is made of an alloy steel consisting essentially of less than 0.3 wt % C, 8.0 to 20.0 wt % Cr, 0.1 to 1.5 wt % Mn, 0.1 to 2.0 wt % Si, 0.4 to 3.0 wt % Mo, 0.4 to 2.0 wt % V, 1.0 to 3.5 wt % Ni, 1.0 to 10.0 wt % Co, less than 0.2 wt % N and the balance of Fe and incidental impurity elements, also characterized in that [eq1] or an equation that represents the content (wt %) of at least one element for accelerating the formation of ferrite in the base material and [eq2] or an equation that represents the content (wt %) of at least one element for accelerating the formation of austenite in the base material satisfy the following interrelationship:

$$[eq2] \geq 0.04 \times [eq1] - 0.39 \quad (1)$$

where $[eq1] = Cr\% + Si\% + 1.5\,Mo\% + 3.5\,V\%$; $[eq2] = C\% + 0.83\,N\% + 0.05\,(Co+Ni)\% + 0.12\,Mn\%$
and further characterized by having a surface layer that is formed by nitriding or carbonitriding at a temperature below $Ac_1$, subsequent heating at 900° to 1,200° C., hardening, a subzero treatment and tempering, said surface layer containing 0.15 to 1.2 wt % N and 0.45 to 1.5 wt % of C+N.

Thus, according to the second aspect of the invention which intends to realize rolling bearings that have not only high corrosion resistance but which are suitable for use on airplanes under high-speed and high-temperature conditions, part of the carbon in stainless steels as the base materials which adversely affects the corrosion resistance is replaced by nitrogen so as to limit the carbon level to lie within a specified range and, as a result, the thus treated stainless steels have their corrosion resistance improved significantly over the conventional martensite-base types. In addition, the precipitation strengthening action of nitrides of elements such as Mo and V and the matrix strengthening action of Co and Ni in solid solution not only enhance the high-temperature characteristics of the stainless steels but also impart high core strength under hoop stress, thereby providing rolling bearings of upgraded performance that can be used with advantage under hostile (high-temperature and high-speed) conditions.

The rolling bearings of the invention described above can be tempered at high temperatures of 400° to 600° C. Compared to the conventional martensite-base stainless steels which are solely composed of carbides, the stainless steel of which the rolling bearings of the invention are made and in which part of the carbon content is replaced by nitrogen in solid solution has the advantage that upon tempering at high temperatures, fine-grained nitrides are allowed to undergo secondary precipitation, thereby reducing the amount of Cr which will be lost from the matrix of the bearing and its corrosion resistance is accordingly improved while, at the same time, the bearing's life at high temperature is extended.

It should be remembered that in the rolling bearings of the invention, the "surface layer" means that area of a finished (machined) part such as a rolling element having a diameter of Da, an inner race or an outer race which extends from the surface to a depth of 0.022 Da, or 2.2% of the diameter of the rolling element. This area corresponds to the position of maximal shear stress.

(Modes of the Invention)

Various modes of the present invention will now be described.

To begin with, the actions of the respective alloy components to be used in the rolling bearings of the invention, as well as the reasons why their contents are restricted to lie within certain ranges and their criticalities are explained.

(C<0.5 wt %)

Carbon (C) is an element that creates martensite in the matrix to thereby increase its strength and it is capable of retarding the formation of δ-ferrite which is harmful to toughness. However, from the viewpoint of corrosion resistance, the carbon content is preferably as small as possible. If its content is excessive, a large amount of retained austenite occurs in the core, occasionally leading to deteriorated dimensional stability. A further problem with adding a large amount of carbon is that during steelmaking, Cr forms coarse eutectic carbides and, as a consequence, the Cr level in the matrix becomes insufficient to provide satisfactory corrosion resistance and, in addition, the rolling fatigue strength and toughness are deteriorated. Particularly in the case where carbon is added in excess of 0.5 wt %, eutectic carbides are generated and the steel tends to have a lower corrosion resistance. Therefore, the carbon content is adjusted to less than 0.5 wt %, preferably not more than 0.4 wt %. From the viewpoint of corrosion resistance, it is more desirable to keep the carbon level at 0.2 wt % and below.

(Cr=8.0 to 20.0 wt %)

Chromium (Cr) is the most important of the elements that impart corrosion resistance to steels. If the Cr content is less than 8.0 wt %, good corrosion resistance is not obtained. With increasing Cr content, the corrosion resistance of steels is improved but, on the other hand, δ-ferrite forms to embrittle the steels and deteriorate the core toughness. Therefore, the upper limit of the Cr content is set at 20.0 wt %. In certain cases, the increased Cr content lowers the Ms point, making it impossible to ensure satisfactory hardness after the hardening operation; therefore, the upper limit of the Cr content is desirably set at 16 wt %. From the viewpoint of corrosion resistance, the lower limit of the Cr content is set at 10.0 wt %.

(Mn=0.1 to 1.5 wt %)

Manganese is a deoxidizer and must be used in an amount of at least 0.1 wt %. However, excessive addition of Mn not only lowers the forgeability and machinability of steels but also deteriorates their corrosion resistance by being coexistent with impurities such as S and P. Therefore, the upper limit of the Mn content is set at 1.5 wt %. On the other hand, the increased Mn content increases the amount of retained austenite, occasionally making it impossible to ensure satisfactory hardness after the hardening operation; therefore, the upper limit of the Mn content is desirably set at 0.8 wt %.

(Si=0.1 to 2.0 wt %)

Silicon (Si) is also a deoxidizer and must be used in an amount of at least 0.1 wt %. Silicon is also effective in providing a resisting property for temper softening. However, excessive addition of Si lowers the toughness of steels. Therefore, the upper limit of Si is set at 2.0 wt %.

(Mo=0.40 to 3.0 wt %)

Molybdenum (Mo) is an element that realizes a marked increase in hardenability and a resisting property for temper softening; it is also capable of marked improvement in pitting resistance. Molybdenum has the added advantage of forming nitrides to realize increased strength. Particularly in the case of bearings that are to be used under high-temperature and high-speed conditions as exemplified by aircraft bearings, Mo is added in an amount of at least 0.40 wt %, preferably at least 0.45 wt %. However, excessive addition of Mo lowers the toughness and workability of steels and, therefore, the upper limit of the Mo content is set at 3.0 wt %.

(V=0.40 to 2.0 wt %)

Vanadium (V) is a very effective nitride forming element. Vanadium nitrides are difficult to dissolve and cause secondary hardening during tempering to not only retard the precipitation of Cr nitrides but also enhance the strength of steels. Therefore, particularly in the case of bearings that are to be used under high-temperature and high-speed conditions as exemplified by aircraft bearings, V is added in an amount of at least 0.40 wt %, preferably at least 0.45 wt %. However, excessive addition of V lowers the toughness and workability of steels and, therefore, the upper limit of V is set at 2.0 wt %.

(N in the core)

As already mentioned, if the C content of high chromium steels is unduly small, ferrite will form to cause occasional deterioration in the toughness of steels; therefore, C is essential from a strength viewpoint. On the other hand, from a corrosion resistance viewpoint, C is deleterious and its content is preferably as small as possible. Therefore, the alloy steel to be used in the rolling bearings of the invention is upgraded in performance by replacing part of the carbon content with nitrogen which also has a solid solution strengthening action. Nitrogen (N) is not simply an element that contributes to improved corrosion resistance; if the C content is high, N retards the formation of coarse primary eutectic carbides and, conversely, if the C content is low, N effectively retards the formation of ferrite and lowers the transition temperature, thereby contributing to an improved core toughness. It is worth particular mention that the addition of nitrogen enables the carbon level to be reduced, thereby contributing to a marked improvement in corrosion resistance. As a further advantage, the diffusion time for achieving the necessary case hardness can be shortened. To benefit from these advantages, at least 0.05 wt % of N is preferably added at the stage of steelmaking; however, if 0.2 wt % or more of N is added, air bubbles will form as the molten steel solidifies and a number of voids may be introduced in steel ingots; therefore, the upper limit of the N content is set at less than 0.2 wt %, preferably at 0.15 wt %.

One of the reasons for carbon replacement by nitrogen is as follows. If martensite-base stainless steels (e.g. G and H types) which are solely composed of carbides are subjected to secondary precipitation hardening by hot temper (400° to 600° C.), about four atoms of metal M in a fine-grained metal carbide $M_{23}C_6$ (M may be Cr, Mo or V) will be lost from the matrix per carbon atom. In the present invention, part of the carbon content is replaced by nitrogen in solid solution, so (carbo)nitrides will take on the form of CrN and $Cr_2N$ (Cr may be V or Mo), in which a single nitrogen (N) atom is assigned one or two metallic Cr atoms. In other words, less of the chromium content will be lost from the matrix of the bearing made of the martensite-base stainless steel which is solely composed of carbides and the corrosion resistance of the bearing is accordingly improved. In addition, nitro(carbides) are more corrosion-resistant than pure carbides.

(N and C+N in the surface layer)

The bearing of the invention has different nitrogen levels in the core and the surface layer. The term "surface layer" as used in the invention means that area of a finished (machined) part, say, a rolling element with diameter Da, which extends from the surface to a depth of 0.022 Da, or 2.2% of the diameter Da (hereunder referred to as "2.2% Da depth") and this area corresponds to the position of maximal shear stress on the finished part.

Like carbon, nitrogen is capable of not only strengthening martensite but also improving the resistance of steels to pitting and wear. In order to attain a surface hardness of at least HRC 58 by martensite strengthening and secondary hardening, at least 0.05 wt % of nitrogen must be present in the surface layer. In order to have its effect exhibited to the fullest, nitrogen is preferably added in an amount of at least 0.2 wt %. If the N addition exceeds 1.2 wt %, the corrosion resistance of the steel is not improved on account of the CrN that is yet to be in solid solution or, alternatively, too much of the N content in solid solution produces a large amount of retained austenite, making it impossible to provide satisfactory hardness after the hardening operation. Even if the N content is within the stated range, no improvement in corrosion is achieved if the C content exceeds 0.5 wt %. From the viewpoint of corrosion resistance, the carbon content of the surface layer is preferably not more than 0.4 wt %.

If the total content of carbon and nitrogen (C+N) % in the surface layer is less than 0.45 wt %, the region that exhibits the surface hardness of HRC 58 or more which is necessary for the bearings encompassed by the invention cannot be insured to the 2.2% Da depth which is the required depth of the surface layer.

If the (C+N) % of the surface layer exceeds 1.5 wt %, more of the Cr content will be present as $(Fe,Cr)_7C_3$, $(Fe,Cr)_{23}C_6$ or CrN and either the Cr content of the matrix will decrease or the amount of carbides or nitrides will increase, making it impossible for a stable passivated film to form, thereby deteriorating the corrosion resistance of steels, or if the temperature for nitrogen diffusion is high, a large amount of retained austenite will form, occasionally making it impossible t o attain satisfactory hardness after the hardening operation. Therefore, the total content of carbon and nitrogen in the surface layer is limited to lie within the range of 0.45 to 1.5 wt %.

(Ni=1.0 to 3.5 wt %)

Nickel (Ni) is a very effective austenite stabilizing element and not only does it retard the formation of δ-ferrite but it also dissolves in the matrix to improve the steel os toughness and enhance its high-temperature characteristics. Theref ore, particularly in the case of bearings that are to be used in high-temperature and high-speed conditions as exemplified by aircraft bearings, Ni is added in an amount of at least 0.1 wt %. However, if Ni is added in an amount more than necessary, a large amount of retained austenite will form, occasionally making it impossible to attain satisfactory hardness after the hardening operation. Therefore, the upper limit of the Ni content is set at 3.5 wt %.

(Co=1.0 to 10.0 wt %)

Like nickel, cobalt (Co) is an austenite stabilizing element and not only does it retard the formation of δ-ferrite but it also dissolves in the matrix to retard the aggregation of carbides and improve the high-temperature hardness of steels. Therefore, particularly in the case of bearings that are to be used in high-temperature and high-speed conditions as exemplified by aircraft bearings, Co is added in an amount of at least 1.0 wt %. However, if Co is added in an excessive amount, not only the workability of the steels is impaired but also the manufacturing cost increases. In consideration of these facts, the upper limit of the Co content is set at 10.0 wt %.

(Mo+V 0.8 to 4.0 wt %; Co+Ni=2.0 wt % to less than 12.0 wt %)

In addition to their solid solution strengthening action, molybdenum (Mo) and vanadium (V) combine with C and N to form carbides and nitrides, which contribute a precipitation strengthening action. Therefore, they should be added in such amounts that their total content is at least 0.8 wt %, preferably at least 1.0 wt %. However, if the total content of Mo and V is excessive, δ-ferrite is prone to form and, in addition the workability of the steel is impaired. Therefore, the upper limit of the (Mo+V) % is set at 4.0 wt %.

Cobalt (Co) and nickel (Ni) retard the formation of δ-ferrite which is deleterious to toughness; they are also capable of the solid solution strengthening of the matrix to thereby provide favorable effects on the fatigue strength characteristics of the steel under high temperature. Therefore, Co and Ni should be added in such amounts that their total content is at least 2.0 wt %, preferably at least 2.5 wt %. On the other hand, the effectiveness of Co and Ni is saturated at a total content of 12.0 wt % and no commensurate effect is achieved if more Co and Ni are added; to the contrary, the workability of the steel is impaired. Therefore, considering these facts and cost, the upper limit of the (Co+Ni) % is set to be less than 12.0 wt %.

The present inventors made intensive studies based on the finding that not only the precipitation strengthening by nitrides and carbides but also the solid solution strengthening of the matrix is indispensable for the purpose of improving the fatigue strength of bearings, particularly at high temperatures. As a result, it was revealed that excellent fatigue strength characteristics at high temperatures could be achieved only when Mo and V were contained in a total amount of at least 0.8 wt % and when Co and Ni were contained in a total amount of at least 2.0 wt %. If either one of these conditions is not met, either the precipitation or solid solution strengthening action is insufficient to achieve satisfactory fatigue strength characteristics at high temperature that can withstand the use under high-temperature and high-speed conditions as are required by aircraft bearings.

In the next place, we will discuss the inter-relationship between the contents of the individual elements in the materials composition of the rolling bearings of the invention.

(Interrelationships Between the Contents of Individual Elements)

Even if the contents of the individual elements and the total contents of Mo+V and Co+Ni satisfy the requirements set forth above, δ-ferrite or eutectic carbides may form if the levels of the individual elements do not satisfy the interrelationships specified below.

(I) Basics

Carbon which is one of the elements that accelerate the formation of austenite in the basic material of the bearing may form δ-ferrite or eutectic carbides depending on the content of Cr which is one of the elements that accelerate the formation of ferrite in the basic material.

In view of this fact, the present invention has as its basic concept specifying the interrelationship between the contents of C and Cr.

Stated more specifically, [eq1] which is an equation representing the content of an element for accelerating the formation of ferrite in the basic material and [eq2] which is an equation representing the content of an element for accelerating the formation of austenite in the basic material are interrelated as follows:

$$[eq2] \geq 0.04 \times [eq1] - 0.39 \qquad (1)$$

Basically, [eq1]=Cr % and [eq2]=C %. In order to retard the formation of δ-ferrite, the lower limit of the C content (wt %) is specified to satisfy the following relation:

$$C \% \geq 0.04 \times Cr \% - 0.39$$

In order to retard the formation of eutectic carbides (particularly in the case of high Cr content), the upper limit of the C content is specified to satisfy the following relation:

$$C \% \leq -0.05 \times Cr \% + 1.41$$

(II) Case of Using Bearings Under Comparatively Mild Conditions (as in Food Processing Machines):

Depending on the interrelationship between the contents of C and Cr, δ-ferrite or eutectic carbides may form. In contrast, nitrogen (N) is capable of retarding the formation of eutectic carbides and δ-ferrite. This feature of nitrogen may be utilized for retarding the formation of δ-ferrite and eutectic carbides in spite of the decrease in the C content and the increase in the Cr content.

On the basis of this observation, the formation of δ-ferrite is retarded by relating the lower limit of the c content in the basic material of the bearing to the Cr content and the N content of the basic material (i.e., N in the core) as follows:

$$C \% \geq 0.04 \ Cr \% - 0.83 \ N \% - 0.39$$

On the other hand, the upper limit of the C content in the basic material is specified to satisfy the following:

$$C \% \leq -0.05 \ Cr \% + 1.41$$

which is already set forth above from the viewpoint of retarding the formation of coarse eutectic carbides. If this condition is met, the deterioration in the corrosion resistance and fatigue strength of the bearing as the final product can also be prevented.

Figure 1:
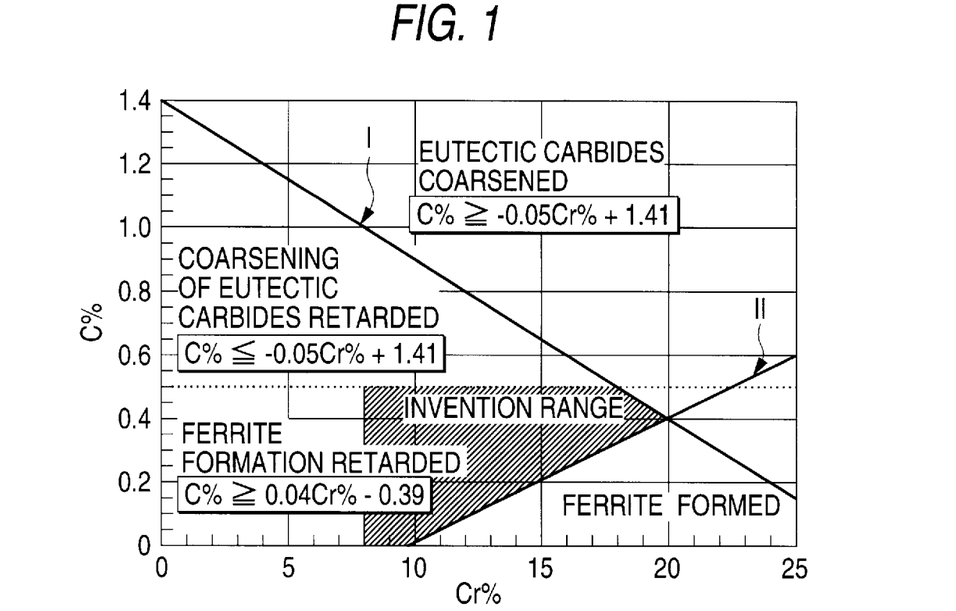
FIG. 1 is a diagram specifying the invention ranges of C and Cr contents for the case where the N content is substantially zero.
Figure 2:
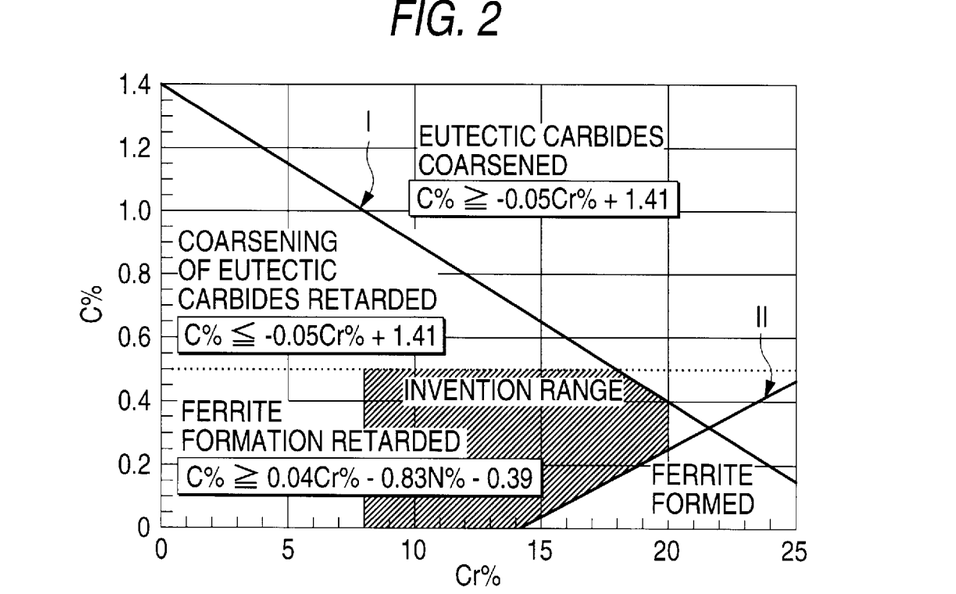
FIG. 2 is a diagram specifying the invention ranges of C and Cr contents for the case where N is contained.
Figure 3:
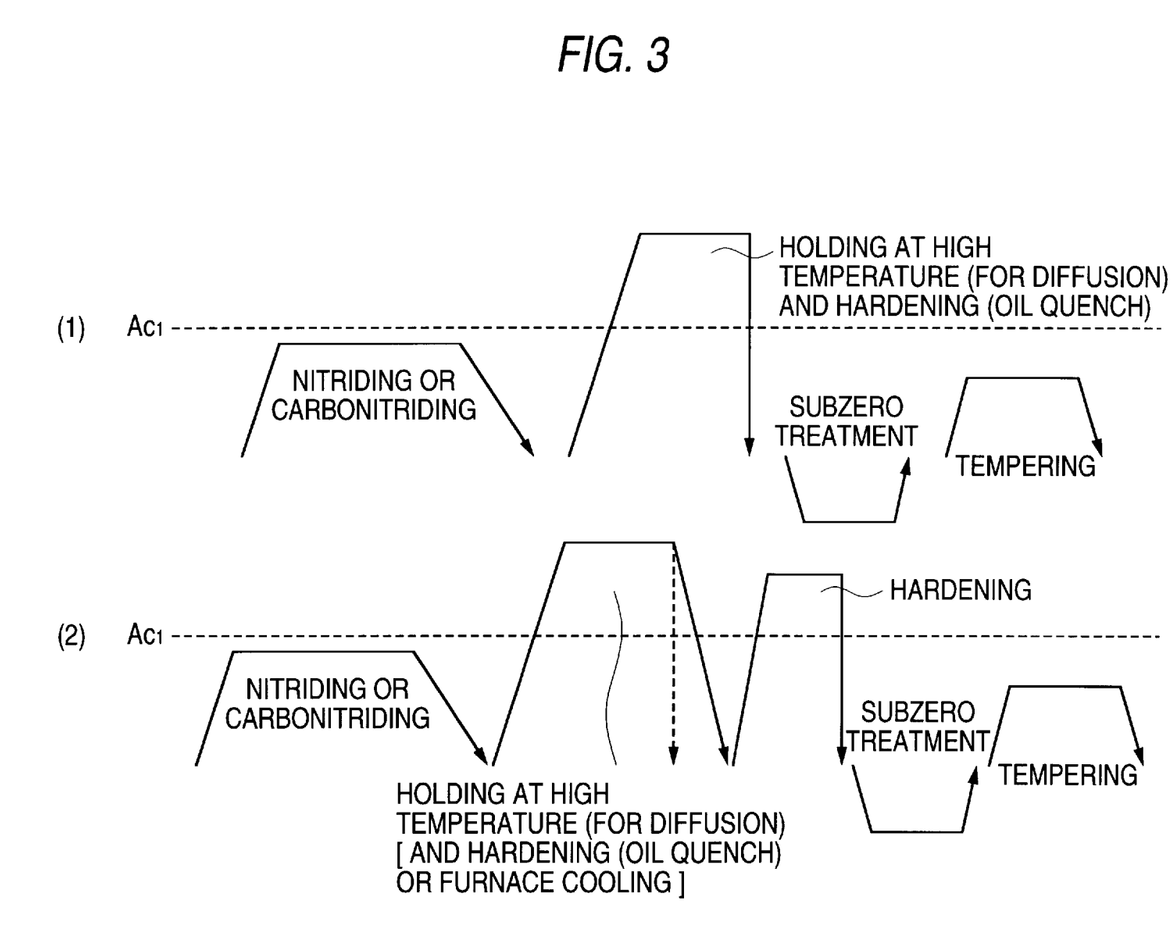
FIG. 3 is a diagram showing the process of heat treating samples of the invention under condition A in part (1) of the diagram and showing the process of heat treating samples of the invention under condition B; in part (2) of the diagram.

FIG. 1 shows a region that is within the scope of the invention in regard to the contents of carbon C and chromium Cr in the basic material; FIG. 2 also shows a region that is within the scope of the invention for the case where nitrogen N is also contained in the basic material.

In either case, the region falling within the scope of the invention is specified not only by the upper and lower limits of the C and Cr contents but also by the formula set forth above to correlate the C content to the contents of Cr and N. Referring to FIGS. 1 and 2, straight line I represents C %=−0.05 Cr %+1.41 and the coarsening of eutectic carbides occurs in the area above this line whereas it is retarded on and below this line. Straight line II in FIGS. 1 and 2 represents C %=0.04 Cr %−0.83 N %−0.39, provided that FIG. 1 refers to the case where N is substantially absent. Since less than 0.2 wt % of nitrogen is specified to be contained in the present invention, straight line II will shift with the variation of the N content within the stated range (if the N content increases, the line will make a parallel downward shift from the position indicated in FIG. 1). Below straight line II, δ-ferrite forms whereas its formation is retarded on and above this line.

In summary, the rolling bearing of the invention is specified to contain certain amounts of C and Cr in at least one member selected from among an inner race, and outer race and rolling elements and the ranges of the permissible contents of C and Cr are represented by the shaded region in FIG. 1 (if N is not contained in the basic material) or in FIG. 2 (if N is contained in a maximum permissible amount).

As already mentioned, a more desirable range of the Cr content is from 10 to 16 wt %, and the carbon content in the basic material is desirably less than 0.4 wt %, more desirably less than 0.3 wt %.

(III) Bearings Particularly Intended for Use under High-Temperature and High-Speed Conditions with the Additional Requirement for Corrosion Resistance (as in Aircraft):

For the basic material of rolling bearings that are to be used under these hostile conditions, it is held essential to incorporate Mo, V, Ni and Co which retard the formation of δ-ferrite and which are capable of the solid solution strengthening of the matrix to impart favorable effects, particularly on the fatigue strength characteristics under high temperature. By adding these elements in appropriate amounts, the formation of δ-ferrite is prevented to provide improved corrosion resistance and, in addition, the solid solution strengthening of the matrix and the precipitation strengthening of the microstructure will combine to provide excellent life characteristics under high temperature.

On the basis of these observations, the rolling bearing of the invention which is upgraded in performance to be particularly suitable for use under high-temperature and high-speed conditions is characterized in that as regards the basic material of at least one member selected from among an inner race, an outer race and rolling elements, not only the contents of individual elements such as C, Cr, Mn, Si, Mo, V, Ni, Co and N are specified but also [eq1] which is an equation representing an element for accelerating the formation of ferrite in the basic material and [eq2] which is an equation representing the content of an element for accelerating the formation of austenite in the basic material are set such that they specifically represent the following:

[eq1]=Cr %+Si %+1.5 Mo %+3.5 V %

[eq2]=C %+0.83 N %+0.05(Co+Ni) %+0.12 Mn %

In addition, the two equations are interrelated to satisfy the already mentioned basic formula:

$$[eq2] \geq 0.04 \times [eq1] - 0.39 \quad (1)$$

Cobalt, nickel, carbon, nitrogen and manganese are austenite stabilizing elements whereas chromium, silicon, molybdenum and vanadium are ferrite stabilizing elements. If formula (1) is not satisfied, δ-ferrite which is deleterious to toughness may occasionally form. In other words, the content of carbon deleterious to corrosion resistance can be reduced by incorporation Co, Ni and N in such amounts that the formula (1) is satisfied. In particular, Co and Ni dissolve in the matrix and retard the aggregation of carbides, thereby achieving marked improvements in the high-temperature hardness and the toughness of the surface layer; the (Co+Ni) %, or the total content of Co and Ni, is preferably at least 2.0 wt %.

Figure 6:
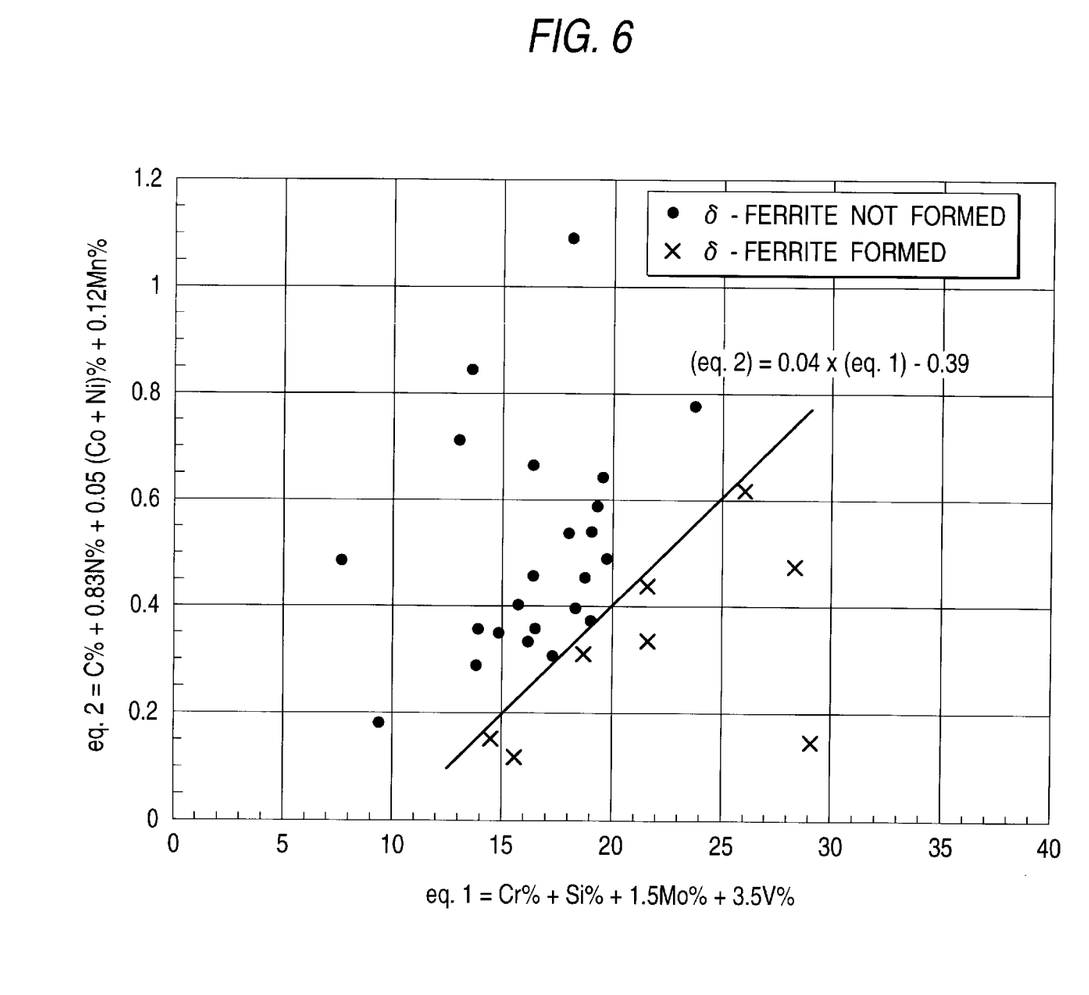
FIG. 6 is a graph showing how the formation δ-ferrite depends on the correlationship between [eq1] and [eq2]

A number of samples were prepared for the basic material of bearings, with the respective terms of [eq1] and [eq2] being varied, and they were checked for the formation of δ-ferrite. The results are shown in FIG. 6, from which one can see that the formation of δ-ferrite can be prevented by ensuring that [eq1] and [eq2] are interrelated to satisfy formula (1).

EXAMPLE 1

An example of the first aspect of the present invention will now be described below.

Steels A to H within the scope of the invention and comparative steels I to M were used as basic materials for producing rolling bearings. The alloying components of the respective steels are identified in Table 1 below, in which the content of each alloying element is expressed in wt %.

TABLE 1

|  | Steel | C | Cr | Mn | Si | N | Mo | V |
|---|---|---|---|---|---|---|---|---|
| Invention | A | 0.04 | 8.87 | 0.46 | 0.53 | 0.10 | — | — |
|  | B | 0.22 | 13.24 | 0.55 | 0.50 | — | — | — |
|  | C | 0.38 | 12.30 | 0.64 | 0.60 | — | — | 0.98 |
|  | D | 0.18 | 12.92 | 0.56 | 0.42 | 0.18 | 1.09 | 0.94 |
|  | E | 0.23 | 12.15 | 0.53 | 0.48 | 0.13 | 2.04 | — |
|  | F | 0.18 | 15.27 | 0.55 | 0.45 | 0.07 | 0.99 | — |
|  | G | 0.32 | 18.29 | 0.43 | 0.72 | — | — | — |
|  | H | 0.42 | 14.92 | 0.58 | 0.48 | — | 0.48 | 1.01 |
| Comparison | I | 0.64 | 12.60 | 0.59 | 0.36 | — | 0.04 | — |
|  | J | 1.02 | 17.12 | 0.59 | 0.36 | — | 0.40 | — |
|  | K | 0.40 | 7.15 | 0.72 | 0.52 | — | — | — |
|  | L | 0.50 | 15.86 | 0.55 | 0.45 | 0.12 | — | — |
|  | M | 0.22 | 19.83 | 0.57 | 0.41 | 0.18 | 0.87 | — |

The samples of the invention were heat treated under condition A or B, which are identified below and in FIG. 3-1.

Condition A
 Pretreatment (nitriding): Ion nitriding (530° to 780° C.)
 Holding at high temperature (for diffusion) and hardening:
 Holding at 1,020° to 1,120° C. for 30 min to 3 h, followed by oil quench
 Subzero treatment: −190° C.×20 min
 Tempering: 180° C.×2 h Condition B
 Same as condition A, except that tempering was performed at 450° to 520° C. for 2 h.

The comparative samples were heat treated under conditions C to G.

Condition C
 Pretreatment (nitriding): Ion nitriding (530° to 780° C.)
 Hardening: Holding at 870° C. for 3 h, followed by oil quench
 Subzero treatment: −190° C.×20 min
 Tempering: 180° C.×2 h Condition D
 Pretreatment (nitriding): High-temperature nitriding (in high-purity $N_2$ gas atmosphere) at 1,150° C. for 4 h
 Hardening: Direct hardening
 Subzero treatment: −190° C.×20 min
 Tempering: 180° C.×2 h Condition E
 Pretreatment (carburizing): Plasma carburizing at 950° C.×8 h
 Hardening: Holding at 1,020° C.×30 min, followed by oil quench
 Tempering: 180° C.×2 h Condition F
 Pretreatment: Not performed.
 Hardening: Holding at 1,050° C. for 30 min, followed by oil quench
 Subzero treatment: −80° C.×1 h
 Tempering: 180° C.×2 h Condition G
 Same as condition F, except that tempering was performed at 450° to 520° C. for 2 h.

Table 2 shows the quality of each specimen after heat treatment, as well as the results of evaluation for corrosion resistance by a salt spray test or the measurement of pitting potential, the result of a wear test and the result of a fatigue strength test.

TABLE 2

|  | Specimen No. | Steel | Heat treatment | C in the surface layer (wt %) | N in the surface layer (wt %) | C + N in the surface layer (wt %) | Hardness HRC | C + N at 2.2% Da depth (wt %) | Eutectic carbides in the core | Salt spray (50 h) | Pitting potential mV vs SCE | Wear (× 10⁻⁵ g/m) | Fatigue strength (× 10⁷ cycles) |
|---|---|---|---|---|---|---|---|---|---|---|---|---|---|
| Invention | 1 | A | A | 0.04 | 0.58 | 0.62 | 60.5 | 0.56 | negative | ◉ | 207 | 0.50 | 12.3 |
|  | 2 | B | A | 0.20 | 0.46 | 0.66 | 60.8 | 0.64 | " | ◉ | 325 | 0.48 | 12.0 |
|  | 3 | C | A | 0.34 | 0.48 | 0.82 | 61.7 | 0.82 | " | ◉ | 287 | 0.42 | 11.8 |
|  | 4 | D | A | 0.14 | 1.16 | 1.30 | 62.0 | 0.92 | " | ○ | 188 | 0.17 | 14.6 |
|  | 5 | D | A | 0.17 | 0.45 | 0.62 | 60.2 | 0.60 | " | ◉ | 336 | 0.51 | 12.8 |
|  | 6 | E | A | 0.20 | 0.52 | 0.72 | 61.2 | 0.68 | " | ◉ | 286 | 0.47 | 12.7 |
|  | 7 | F | A | 0.18 | 0.30 | 0.48 | 58.9 | 0.47 | " | ◉ | 348 | 0.65 | 9.5 |
|  | 8 | G | A | 0.30 | 0.28 | 0.58 | 60.1 | 0.58 | " | ◉ | 325 | 0.55 | 10.9 |
|  | 9 | H | A | 0.41 | 0.08 | 0.49 | 59.6 | 0.49 | " | ○ | 194 | 0.61 | 11.4 |
|  | 10 | B | B | 0.20 | 0.46 | 0.66 | 61.2 | 0.64 | " | ◉ | 205 | 0.18 | 11.1 |
|  | 11 | C | B | 0.34 | 0.48 | 0.82 | 62.0 | 0.82 | " | ○ | 189 | 0.16 | 13.3 |
|  | 12 | D | B | 0.17 | 0.45 | 0.62 | 61.4 | 0.60 | " | ◉ | 222 | 0.16 | 12.2 |
|  | 13 | F | B | 0.18 | 0.30 | 0.48 | 59.4 | 0.47 | " | ◉ | 267 | 0.32 | 10.9 |
| Comparison | 14 | I | F | 0.64 | — | 0.64 | 58.2 | 0.64 | 6 μm | x | −187 | 0.68 | 7.6 |
|  | 15 | J | F | 1.02 | — | 1.02 | 59.7 | 1.02 | 23 μm | x | −194 | 0.49 | 1.9 |
|  | 16 | I | G | 0.64 | — | 0.64 | 55.4 | 0.64 | 6 μm | x | −267 | 1.12 | 1.7 |
|  | 17 | J | G | 1.02 | — | 1.02 | 56.8 | 1.02 | 23 μm | x | −298 | 0.87 | 1.1 |
|  | 18 | K | A | 0.38 | 0.28 | 0.66 | 60.8 | 0.65 | negative | Δ | 42 | 0.55 | 10.8 |
|  | 19 | L | A | 0.50 | 0.26 | 0.76 | 60.2 | 0.74 | " | Δ | 28 | 0.53 | 11.9 |
|  | 20 | B | C | 0.18 | 1.38 | 1.56 | 62.4 | 0.28 | " | x | −67 | 0.12 | 2.9 |
|  | 21 | B | D | 0.20 | 0.20 | 0.40 | 57.4 | 0.40 | " | ◉ | 298 | 0.94 | 4.7 |
|  | 22 | B | E | 1.83 | — | 1.83 | 62.7 | 1.77 | " | x | −302 | 0.17 | 9.8 |
|  | 23 | C | D | 0.38 | 0.24 | 0.62 | 59.8 | 0.60 | " | ◉ | 268 | 0.63 | 4.6 |

Comparative steel M was found to contain ferrite in the as-hardened microstructure and hence no subsequent evaluation was made. The formation of eutectic carbides was rated "negative" when there were found no carbide grains greater than 3 μm.

The salt spray test was performed using a 5% NaCl solution at 35° C. and the result was evaluated by examining the specimen's appearance after 50 h of the test. The criteria were as follows: ◉, no rust formation; ○, slight rust formation; Δ, rust formed almost on the entire surface; x, extensive rust formation.

The measurement of pitting potential was performed by the following procedure: a specimen was ground and polished using various grades of grit and progressing to an 800 grit; the specimen was then immersed in a 30% $HNO_3$ solution at 60° C. for 1 h to passivate the surface; the specimen was immersed in a 3.5% NaCl solution at 30° C., to which voltage was applied at a sweep rate of 20 mV/min; when the current density reached 100 $\mu A/cm^2$, voltage (mV vs SCE) was measured.

The methods of the salt spray test and the measurement of pitting potential were in accordance with the Japanese Industrial Standards (JIS).

Figure 4:
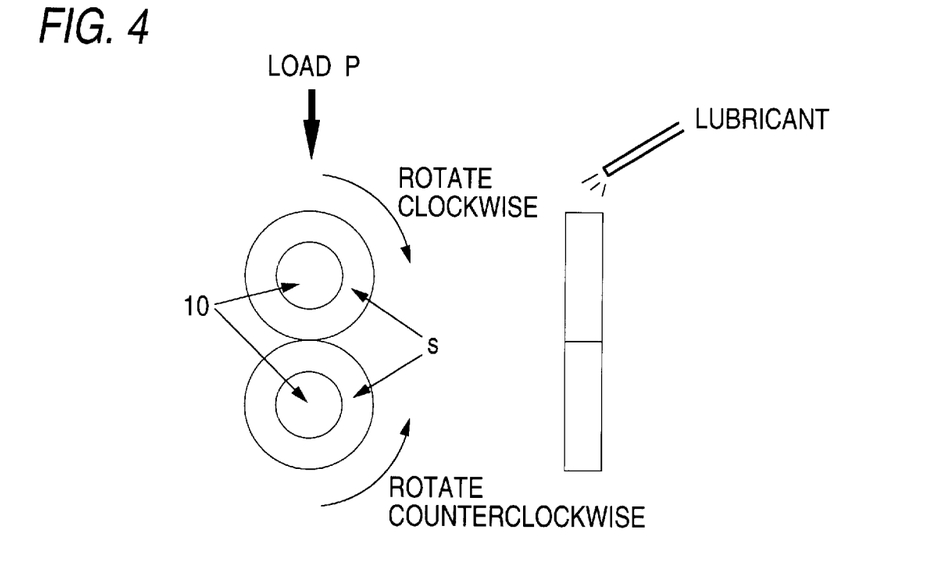
FIG. 4 shows diagrammatically an experimental setup of a two-cylinder wear tester.

The wear test was conducted using a two-cylinder wear tester shown in FIG. 4 under the conditions set forth below. The mating member was the same in all test runs.

Load: 50 kgf

Rotational Speed: 200 rpm

Slip factor: 30%

Lubrication: S10

The fatigue strength test was performed using a MORI thrust rolling fatigue strength tester under the following conditions.

Contact pressure: 4900 MPa

Rotational speed: 1000 rpm

Lubricant: Turbine oil No. 68

Specimens Nos. 1 to 13 in Table 2 which were the samples prepared in accordance with the present invention were all satisfactory in corrosion resistance. Even the specimens designated Nos. 10 to 13 which were subjected to high-temperature temper exhibited high corrosion resistance.

The samples of the invention also had good fatigue strength and, in particular, specimens Nos. 11 to 13 which were subjected to high-temperature temper had improved wear resistance due to the secondary precipitation of fine-grained nitrides.

In contrast, comparative specimens Nos. 14 and 15 which were prior art steels were very poor in corrosion resistance compared to the invention samples and, what is more, specimen No. 15 was very low in fatigue strength due to the presence of coarse eutectic carbides comprising grains longer than 20 μm in major axis.

Comparative specimens Nos. 16 and 17 were prepared by tempering specimens Nos. 14 and 15, respectively, at high temperature; on account of the tempering, these specimens softened to become deteriorated in fatigue strength and corrosion resistance.

Comparative specimen No. 18 had a Cr content below 8.0 wt % and, hence, it was not as corrosion-resistant as the specimens prepared from the invention samples.

Comparative specimen No. 19 had an unduly high carbon content; in the absence of eutectic carbides, this specimen had satisfactory fatigue strength but it was not as corrosion-resistant as the specimens prepared from the invention samples.

Comparative specimen No. 20 was unduly high in the N content and the total content of C+N; the residual compound layer on the surface precluded the development of satisfactory corrosion resistance and, in addition, due to the low hardening temperature, the diffusion of nitrogen was insufficient to provide the necessary depth of a hardened layer, resulting in a reduced fatigue strength.

Comparative specimen No. 21 contained carbon and nitrogen in such amounts that their total content was less than 0.45 wt %; due to the insufficient dissolution of these elements, adequate hardness and, hence, satisfactory fatigue strength was not attained.

Comparative specimen No. 22 was prepared by carburizing a steel within the scope of the invention; it was satisfactory in both wear resistance and fatigue strength but its corrosion resistance was considerably low.

Comparative specimen No. 23 was prepared by nitriding another steel of the invention at the conventional high temperature; it had satisfactory corrosion resistance but the crystal grains were so coarse that the steel had an undesirably low fatigue strength.

Figure 5:
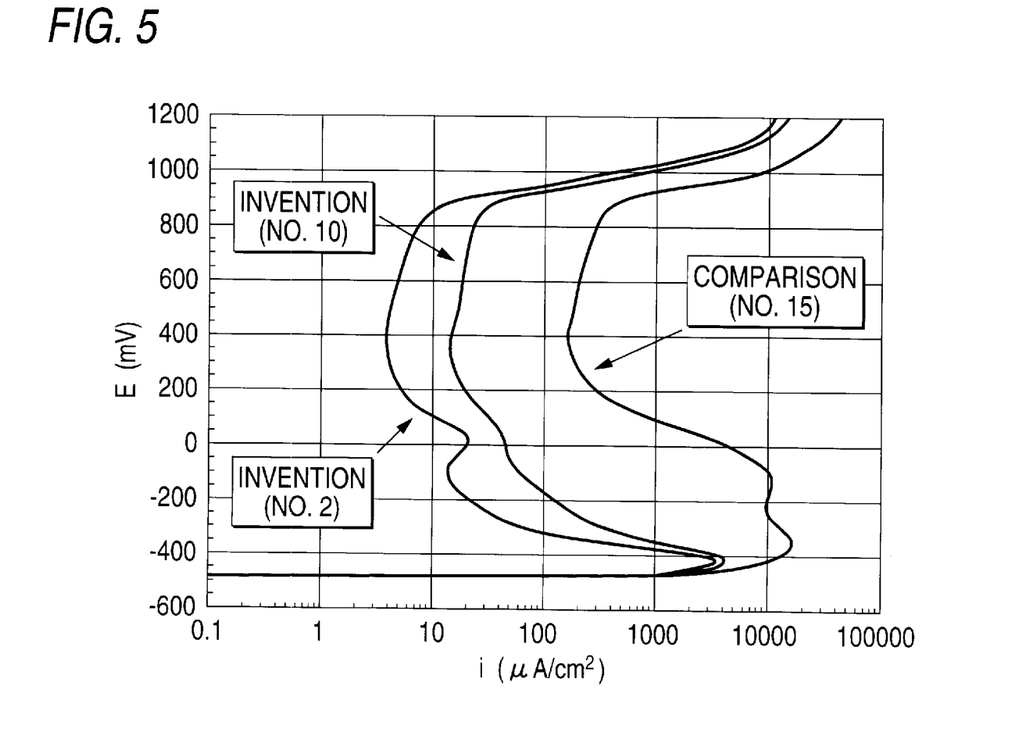
FIG. 5 is a graph showing the results of measurement on anode polarization curves for two invention stainless steels and one comparative stainless steels.

FIG. 5 shows anode polarization curves for two specimens of the invention (Nos. 2 and 10) and one comparative specimen (No. 15); obviously, the steels prepared and treated in accordance with the invention had markedly better corrosion resistance than the comparative steel.

EXAMPLE 2

Rolling bearings according to second aspect of the invention which were particularly intended for use under high-temperature and high-speed conditions were tested.

The alloying components of the steels used as samples of the invention, as well as those of the comparative steels are shown in Table 3, in which the content of each component is expressed in wt %.

Tables 4 and 5 show the quality of each specimen after heat treatment, as well as the results of evaluation for corrosion resistance by a salt spray test or the measurement of pitting potential, the result of a impact test and the result of a fatigue strength test at high temperature.

TABLE 3

|  | Steel | C | Cr | Mn | Si | Mo | V | Co | Ni | N |
|---|---|---|---|---|---|---|---|---|---|---|
| Invention | N | 0.16 | 13.15 | 0.53 | 0.57 | 0.48 | 0.57 | 1.61 | 1.05 | — |
|  | O | 0.23 | 15.54 | 0.62 | 0.52 | 0.64 | 0.48 | 1.98 | 1.02 | — |
|  | P | 0.14 | 12.96 | 0.58 | 0.54 | 0.98 | 1.23 | 4.98 | 2.55 | — |
|  | Q | 0.04 | 12.85 | 0.65 | 0.40 | 1.75 | 0.60 | 5.67 | 2.73 | — |
|  | R | 0.03 | 12.98 | 0.59 | 0.38 | 0.47 | 1.56 | 6.01 | 2.86 | 0.12 |
|  | S | 0.04 | 15.34 | 0.55 | 0.56 | 0.56 | 0.64 | 4.54 | 1.98 | 0.13 |
|  | T | 0.27 | 14.98 | 0.53 | 0.48 | 2.13 | 1.46 | 5.97 | 2.89 | — |
|  | A' | 0.12 | 12.98 | 0.57 | 0.48 | 0.43 | 0.49 | 1.06 | 1.02 | — |
|  | B' | 0.07 | 12.74 | 0.53 | 0.48 | 0.45 | 0.42 | 1.46 | 1.25 | — |
| Comparison | U | 0.05 | 12.85 | 0.45 | 0.62 | 0.48 | 0.38 | 0.09 | 0.12 | — |
|  | V | 0.04 | 15.59 | 0.52 | 0.53 | 0.58 | 0.47 | 1.46 | 1.47 | 0.07 |
|  | W | 0.13 | 12.56 | 0.76 | 0.52 | 0.48 | 0.28 | 0.98 | 1.57 | — |
|  | X | 0.17 | 12.79 | 0.59 | 0.55 | 0.61 | 0.53 | 0.68 | 1.15 | — |
|  | Y | 0.80 | 3.82 | 0.32 | 0.35 | 3.85 | 1.04 | — | 0.04 | — |
|  | Z | 0.15 | 3.86 | 0.27 | 0.18 | 3.85 | 1.15 | — | 3.42 | — |
|  | J | 1.02 | 17.12 | 0.59 | 0.36 | 0.40 | — | — | — | — |

TABLE 4

|  | Specimen No. | Steel | Heat treatment | C in the surface layer (wt %) | N in the surface layer (wt %) | C + N in the surface layer (wt %) | Hardness, HRC | Hardness at 300° C. HRC |
|---|---|---|---|---|---|---|---|---|
| Invention | A-1 | N | A | 0.15 | 0.58 | 0.73 | 61.7 | — |
|  | A-2 | O | H | 0.21 | 0.47 | 0.68 | 61.9 | — |
|  | A-3 | N | B | 0.15 | 0.58 | 0.73 | 62.4 | 60.3 |
|  | A-4 | O | B | 0.21 | 0.47 | 0.68 | 62.7 | 60.4 |
|  | A-5 | P | L | 0.13 | 0.78 | 0.91 | 62.9 | 60.9 |
|  | A-6 | Q | B | 0.04 | 0.78 | 0.82 | 62.4 | 60.7 |
|  | A-7 | R | B | 0.03 | 0.93 | 0.96 | 63.0 | 60.8 |
|  | A-8 | S | B | 0.04 | 0.70 | 0.74 | 62.8 | 60.3 |
|  | A-9 | T | B | 0.24 | 0.59 | 0.83 | 63.0 | 60.9 |
|  | A-10 | A' | B | 0.10 | 0.65 | 0.75 | 61.8 | 59.5 |
|  | A-11 | B' | B | 0.06 | 0.74 | 0.80 | 62.2 | 59.6 |
| Comparison | B-1 | W | B | 0.12 | 0.71 | 0.83 | 61.5 | 58.8 |
|  | B-2 | X | A | 0.15 | 0.68 | 0.83 | 61.7 | — |
|  | B-3 | X | B | 0.15 | 0.68 | 0.83 | 62.2 | 59.2 |
|  | B-4 | T | D | 0.26 | 0.26 | 0.52 | 60.6 | — |
|  | B-5 | T | I | 0.26 | 0.26 | 0.52 | 60.7 | 59.5 |
|  | B-6 | Y | J | 0.80 | — | 0.80 | 62.8 | 58.2 |
|  | B-7 | Z | K | 0.80 | — | 0.80 | 62.4 | 58.3 |
|  | B-8 | J | F | 1.02 | — | 1.02 | 59.7 | — |
|  | B-9 | J | G | 1.02 | — | 1.02 | 56.8 | 50.5 |

TABLE 5

| Specimen No. | | C + N at 2.2% Da depth (wt %) | Salt splay test (50 h) | Pitting potential, mV vs SCE | Impact Strength kgf·m | Fatigue Strength (h) |
|---|---|---|---|---|---|---|
| Invention | A-1 | 0.68 | ⊚ | 343 | 12.4 | 308 |
| | A-2 | 0.66 | ⊚ | 362 | 12.3 | 312 |
| | A-3 | 0.70 | ⊚ | 270 | 9.8 | 408 |
| | A-4 | 0.65 | ⊚ | 260 | 10.6 | 412 |
| | A-5 | 0.85 | ⊚ | 289 | 10.3 | 458 |
| | A-6 | 0.76 | ⊚ | 283 | 10.5 | 433 |
| | A-7 | 0.85 | ⊚ | 258 | 10.0 | 462 |
| | A-8 | 0.70 | ⊚ | 268 | 10.6 | 398 |
| | A-9 | 0.78 | ⊚ | 273 | 9.7 | 401 |
| | A-10 | 0.70 | ⊚ | 246 | 11.0 | 268 |
| | A-11 | 0.78 | ⊚ | 274 | 10.7 | 278 |
| Comparison | B-1 | 0.77 | ⊚ | 262 | 10.1 | 174 |
| | B-2 | 0.78 | ⊚ | 359 | 9.5 | 169 |
| | B-3 | 0.78 | ⊚ | 260 | 9.7 | 178 |
| | B-4 | 0.52 | ⊚ | 337 | 6.3 | 156 |
| | B-5 | 0.52 | ⊚ | 248 | 5.6 | 163 |
| | B-6 | 0.80 | x | −453 | 3.2 | 133 |
| | B-7 | 0.78 | x | −440 | 11.8 | 178 |
| | B-8 | 1.02 | x | −194 | 1.7 | 69 |
| | B-9 | 1.02 | x | −298 | 1.6 | 54 |

The specimens prepared in accordance with the present invention and the comparative specimens were checked for the formation of δ-ferrite and the results are plotted in FIG. 6 for the respective basic materials; the horizontal axis of the graph in FIG. 6 represents [eq1]=Cr %+Si %+1.5 Mo %+3.5 V % and the vertical axis represents [eq2]=C %+0.83 N %+0.05(Co+Ni) %+0.12 Mn %.

From FIG. 6, one can confirm that the formation of δ-ferrite could be prevented in the region that satisfies the following relation:

$$[eq2] \geq 0.04 \times [eq1] - 0.39 \quad (1)$$

Steels U and V in Table 3 did not satisfy the formula (1) and were found to contain δ-ferrite in the as hardened microstructure; hence, no subsequent evaluation was made. What should be particularly noted is that although comparative steel V contained the necessary amounts of Co, Ni and Co+Ni, with the contents of Mo, V and Mo+V not exceeding their respective upper limits, the formation of δ-ferrite was recognized since said steel did not satisfy the relation (1).

The samples of the invention were heat treated under conditions A, B, H and L, which are identified below.

Conditions A and B

Same as in Example 1 (see FIG. 3-1 for the treatment pattern).

Condition H

See FIG. 3-2 for the treatment pattern.

Pretreatment (nitriding): Ion nitriding (530° to 780° C.)

Hardening: Holding at 1,020° to 1,120° C. for 30 min to 3 h, followed by furnace cooling; after furnace cooling, reheating was done at 1,020° to 1,120° C. for 30 min, followed by oil quench Subzero treatment: −190° C.×20 min Tempering: 180° C.×2 h Condition L See FIG. 3-2 for the treatment pattern.

Pretreatment (nitriding): Ion nitriding

Hardening: Holding at 1,020° to 1,120° C.×30 min–3 h, followed by furnace cooling; after furnace cooling, reheating was done at 1,020° to 1,120° C. for 30 min, followed by oil quench Subzero treatment: −190° C.×20 min Tempering: 450° to 520° C.×2 h The comparative samples were heat treated under conditions D, F, G and I to K, which are identified below.

Conditions D, F and G:

Same as in Example 1.

Condition I

Pretreatment (nitriding): High-temperature nitriding (in high-purity $N_2$ gas atmosphere) at 1,150° C. for 4 h Hardening: Direct hardening Primary tempering: Air cooling at 450° to 520° C. for 2 h Subzero treatment: −190° C.×20 min Secondary tempering: 450° to 520° C.×2 h (conducted twice)

Condition J

Pretreatment (nitriding): Not conducted

Hardening: Holding at 1,120° C.×30 min, followed by oil quench

Primary tempering: Air cooling at 500° to 550° C. for 2 h

Subzero treatment: −80° C.×1 h

Secondary tempering: 500° to 550° C.×2 h (conducted twice)

Condition K

Pretreatment (carburizing): 925° C.×4 h

Hardening: Holding at 1,120° C. for 30 min, followed by oil quench

Primary tempering: Air cooling at 500° to 500° C. for 2 h

Subzero treatment: −80° C.×1 h

Secondary tempering: 500° to 500° C.×2 h (conducted twice)

The data shown in Table 5 as results of the salt spray test and the measurement of pitting potential were obtained by the same procedures as in Example 1.

The core toughness was evaluated by a Charpy impact test (with a test piece measuring 10×10×55 mm having a notch of 2 mm and 5R) which was conducted at ordinary temperature.

The fatigue strength test was conducted with a deep-grooved ball bearing 6206 under the following conditions:

Temperature: 170° C.

P/C: 0.71

Lubrication: Jet Oil II

Ball: M50

The specimens designated A-1 to A-9 in Tables 4 and 5 which were prepared from samples within the scope of the invention were all satisfactory in corrosion resistance; they also had values of impact strength and high-temperature fatigue strength characteristics which exceeded those of AISIM50 from which comparative specimen B-6 was prepared. Specimens A-3 to A-11 which were subjected to high-temperature temper were particularly long-lived. Specimens A-1 and A-3 made of the same steel species and specimens A-2 and A-4 made of the same steel species. However, specimens A-3 and A-4 which were tempered at the higher temperate had bearing's fatigue strength values that were about 100 h longer than those of specimens A-1 and A-2; it is therefore clear that tempering at high temperature is effective in extending the service life of bearings at elevated temperatures.

Figure 7:
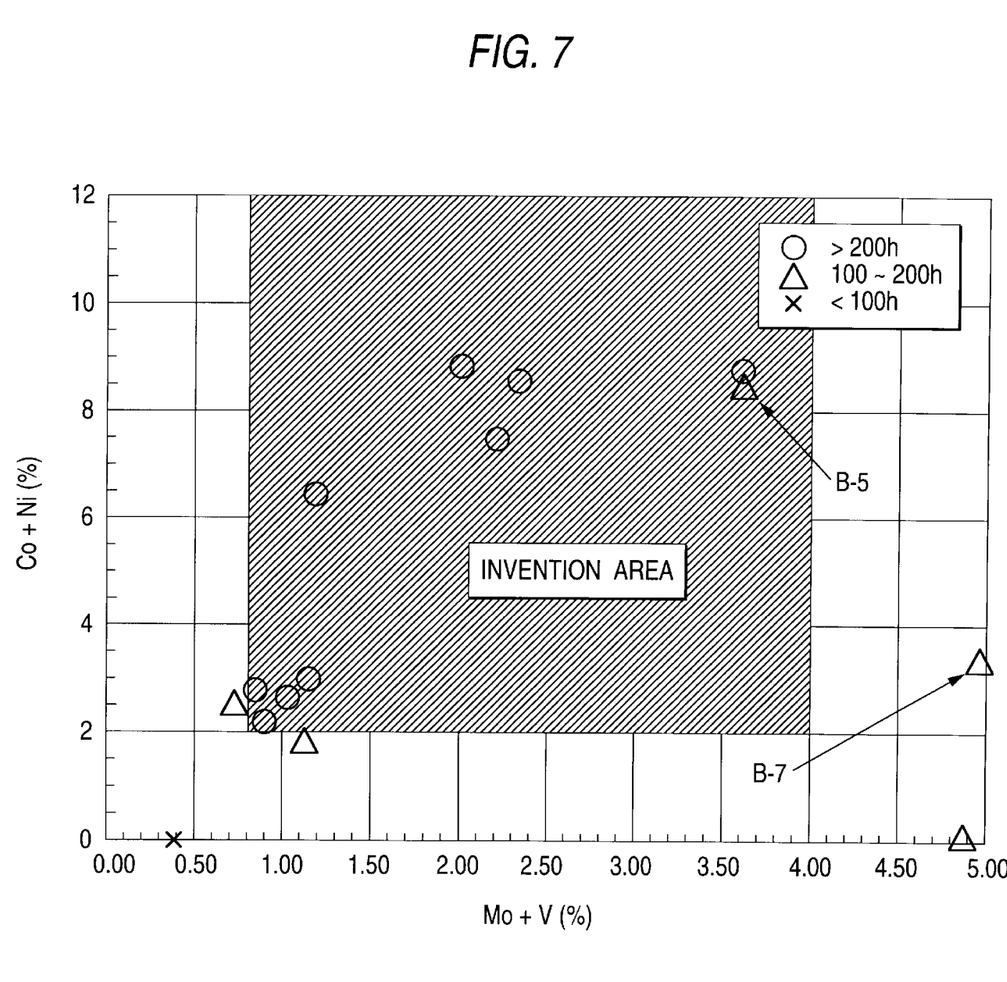
FIG. 7 is a graph showing how the high-temperature fatigue strength of bearings is determined by the (Co+Ni) % and (MO+V) %.

FIG. 7 shows how the total content of Co+Ni and that of Mo+V will affect the fatigue strength of bearings at high temperature. Obviously, when the total content of Co+Ni was less than 2.0 wt %, the matrix was solid solution strengthened only insufficiently that there was no improvement in the bearing's fatigue strength at high temperature. On the other hand, when the total content of Mo+V was less than 0.8 wt %, the precipitation strengthening effect was insufficient that there was also no improvement in the bearing's fatigue strength at high temperature.

In contrast, the specimens that were within the hatched area of FIG. 7 (designated as the "invention area") with respect to the (Co+Ni) % and (Mo+V) % were all characterized by satisfactory fatigue strength (>200 h), excepting specimen B-5 which was not nitrided at a temperature below $Ac_1$. In particular, the specimens characterized by Mo+V≧1 wt % and Co+Ni≧2.5 wt % had fatigue strength values in excess of 300 h as is clear form Table 4.

In contrast, comparative specimens B-1, B-2 and B-3 did not meet the requirements of the invention in terms of either (Co+Ni) % or (Mo+V) % and, hence, they were inferior to the specimens of the invention in terms of fatigue strength at high temperature.

Comparative specimens B-4 and B-5 were prepared by high-temperature nitriding in a nitrogen gas atmosphere; however, they were subjected to direct nitriding at high temperature, so there was no reason to expect the grain boundary pinning effect of nitride precipitates. Instead, the crystal gains became coarse (greater than 200 μm in size) and it was impossible to attain satisfactory fatigue strength and impact strength characteristics.

Comparative specimens B-6 and B-7 were made of AISIM50 and AISIM50NiL, respectively. They exhibited better impact strength and high-temperature fatigue strength characteristics than comparative test pieces B-8 and B-9 which were each made of SUS440C; on the other hand, their corrosion resistance was extremely poor. Comparative specimen B-6 also had a comparatively low impact value and this was because macro-carbides had been formed due to high carbon level.

Comparative specimens B-8 and B-9 were made of SUS440C and even this high-quality steel was by far inferior in corrosion resistance compared to the steels within the scope of the invention. It is worth particular mention that basic materials such as SUS440C and M50 which was interspersed with coarse carbides in the microstructure were inferior in fatigue strength compared to the invention steels.

As is clear from the foregoing description, the present invention offers case hardened (nitrogen diffused) rolling bearings that are improved over the conventional martensite-base stainless steel bearings in terms of corrosion resistance and rolling fatigue strength and which also have satisfactory wear resistance. The invention also offers case hardened (nitrogen diffused) rolling bearings that are not only high in corrosion resistance but which also have better high-temperature fatigue strength characteristics than the bearings made of the conventional semi-high-speed steel AISIM50.

In all of the heat treatments performed in Examples 1 and 2, the ion nitriding may be replaced by plasma carbonitriding. The process shown in FIG. 3-1 may be modified as shown in FIG. 3-2, in which each of the steps of holding at high temperature and hardening is performed in two stages; stated more specifically, holing at 1,020° to 1,120° C. for 30 min–3 h is followed by oil quench or furnace cooling and, thereafter, reheating is done at 1,020° to 1,120° C. for 30 min, followed by oil quench. In this alternative embodiment, tempering may be performed by a heat treatment under either condition A or B.

Advantages of the Invention

As described above, according to the first aspect of the invention, the stainless steel material from which the rolling bearing of the invention is to be made is characterized in that carbon which is not only deleterious to corrosion resistance but which, when contained in a large amount, also deteriorates the bearing's performance by forming coarse eutectic carbides is partly replaced by nitrogen having a comparable solid solution strengthening action such that the carbon level is limited to lie within a certain range. By so doing, the corrosion resistance is markedly enhanced over the conventional martensite-base stainless steels and, in addition, the formation of coarse eutectic carbides can be retarded. As a result, there can be provided rolling bearings of high performance that have excellent corrosion resistance, that can be subjected to high-temperature tempering without softening but which instead will maintain satisfactory rolling fatigue strength and wear resistance and which also have high enough core strength under hoop stress to be suitable for use in aircraft or food processing machines.

According to the second aspect of the invention, the above-described nitrogen substitution is combined with the precipitation strengthening effect of Mo and V carbides and the matrix strengthening effect of dissolved Co and Ni. This not only enhances the high-temperature characteristics but also imparts high core strength under hoop stress; as a consequence, there can be provided rolling bearings of high performance that are particularly suitable for use under hostile (high-temperature and high-speed) conditions as are experienced in aircraft jet engines and gas turbines.

We claim:

1. A rolling bearing comprising an inner race, an outer race and rolling elements, in which at least one member selected from among said inner race, said outer race and said rolling elements is made of an alloy steel consisting essentially of less than 0.5 wt % C, 8.0 to 20.0 wt % Cr, 0.1 to 1.5 wt % Mn, 0.1 to 2.0 wt % Si and the balance of Fe and incidental impurity elements, with the relationship between the C and Cr contents satisfying:

$$0.04 \text{ Cr (wt \%)} - 0.39 \leq \text{C (wt \%)} \leq -0.05 \text{ Cr (wt \%)} + 1.41,$$

wherein said at least one member comprises a surface layer in which the sum of nitrogen and carbon contents, C+N (wt %), at 2.2% Da depth from the surface is in a range of 0.47–0.92, where Da is a diameter of the rolling element.

2. A rolling bearing comprising an inner race, an outer race and rolling elements, in which at least one member selected from among said inner race, said outer race and said rolling elements is made of an alloy steel consisting essentially of less than 0.5 wt % C, 8.0 to 20.0 wt % Cr, 0.1 to 1.5 wt % Mn, 0.1 to 2.0 wt % Si, 0.05 to less than 0.2 wt % of N, and the balance of Fe and incidental impurity elements, with the relationship among the C, Cr and N contents satisfying:

$$0.04 \text{ Cr wt \%} - 0.83 \text{ N wt \%} - 0.39 \leq \text{C wt \%} \leq -0.05 \text{ Cr wt \%} + 1.41$$

and wherein said at least one element comprises a surface layer in which the sum of the nitrogen and carbon contents, C+N (wt %), at 2.2% Da depth from the surface is in a range of 0.47–0.92, where Da is a diameter of the rolling element.

3. A rolling bearing comprising an inner race, an outer race and rolling elements, wherein at least one member selected from among said inner race, said outer race and said rolling elements is made of an alloy steel consisting essentially of less than 0.3 wt % C, 8.0 to 20.0 wt % Cr, 0.1 to 1.5 wt % Mn, 0.1 to 2.0 wt % Si, 0.4 to 3.0 wt % Mo, 0.4 to 2.0 wt % V, 1.0 to 3.5 wt % Ni, 1.0 to 10.0 wt % Co, less than 0.2 wt % N and the balance of Fe and incidental impurity elements, and in which [eq1] or an equation that represents the content (wt %) of at least one element for accelerating the formation of ferrite in the base material and [eq2] or an equation that represents the content (wt %) of at least one element for accelerating the formation of austenite in the base material satisfy the following interrelationship:

$$[eq2] \geq 0.04 \times [eq1] - 0.39 \tag{1}$$

where [eq1]=Cr wt %+Si wt %+1.5 Mo wt %+3.5 V wt %; [eq2]=C wt %+0.83 N wt %+0.05 (Co+Ni) wt %+0.12 Mn wt % said at least one element comprising a surface layer that is formed by nitriding or carbonitriding at a temperature below $Ac_1$, subsequent heating at 900° to 1,200° C., hardening a subzero treatment and tempering, said surface layer containing 0.15 to 1.2 wt % N and 0.45 to 1.5 wt % of C+N.

4. A rolling bearing according to claim 3, wherein said alloy steel satisfies the following relationship:

Mo+V=0.8 to 4.0 wt %; and

Co+Ni=2.0 to less than 12.0 wt %.

5. A rolling bearing comprising an inner race, an outer race and rolling elements, wherein at least one member selected from among said inner race, said outer race and said rolling elements is made of an alloy steel consisting essentially of less than 0.3 wt % C, 8.0 to 20.0 wt % Cr, 0.1 to 1.5 wt % Mn, 0.1 to 2.0 wt % Si, 0.4 to 3.0 wt % Mo, 0.4 to 2.0 wt % V, 1.0 to 3.5 wt % Ni, 1.0 to 10.0 wt % Co, less than 0.2 wt % N and the balance of Fe and incidental impurity elements, and in which {eq1} or an equation that represents the content (wt %) of at least one element for accelerating the formation of ferrite in the base material and {eq2} or an equation that represent the content (wt %) of at least one element for accelerating the formation of austenite in the base material satisfy the following interrelationship:

$$\{eq2\} \geq 0.04 \times \{eq1\} - 0.39 \tag{1}$$

where {eq1}=Cr wt %+Si wt %+1.5 Mo wt %+3.5 V wt %, and {eq2}=C wt %+0.83 N wt %+0.05 (Co+Ni) wt %+0.12 M wt %;

said at least one element comprising a surface layer in which the sum of the nitrogen and carbon contents, C+N (wt %), at 2.2% Da depth from the surface is in a range of 0.47–0.92, where Da is a diameter of said rolling element, said surface layer containing 0.05 to 1.2 wt % N and 0.45 to 1.5 wt % of C+N.

6. A rolling bearing according to claim 5, wherein said alloy steel satisfies the following relationship:

Mo+V=0.8 to 4.0 wt %; and

Co+Ni=2.0 to less than 12.0 wt %.

* * * * *